(12) United States Patent
Xu et al.

(10) Patent No.: US 10,298,901 B2
(45) Date of Patent: May 21, 2019

(54) METHOD FOR SYNCHRONOUS PLAYBACK BY MULTIPLE SMART DEVICES, AND APPARATUS

(71) Applicant: Huawei Technologies Co., Ltd., Shenzhen, Guangdong (CN)

(72) Inventors: Yangpo Xu, Shenzhen (CN); Xin Liu, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/582,628

(22) Filed: Dec. 24, 2014

(65) Prior Publication Data

US 2015/0215597 A1    Jul. 30, 2015

(30) Foreign Application Priority Data

Jan. 28, 2014    (CN) .......................... 2014 1 0042473

(51) Int. Cl.
*H04N 5/06* (2006.01)
*H04N 9/87* (2006.01)
(Continued)

(52) U.S. Cl.
CPC .......... *H04N 9/87* (2013.01); *G11B 20/10527* (2013.01); *H04L 7/08* (2013.01);
(Continued)

(58) Field of Classification Search
CPC .. H04N 9/87; H04N 5/06; H04N 5/85; H04N 21/64707; H04N 13/10; H04N 9/74;
(Continued)

(56) References Cited

U.S. PATENT DOCUMENTS 6,546,188 B1 * 4/2003 Ishii ..................... G11B 27/031
386/280
8,316,154 B2 * 11/2012 Yoneda ................. H04L 12/282
709/203
(Continued)

FOREIGN PATENT DOCUMENTS

CN    101290790 A    10/2008
CN    102132575 A    7/2011
(Continued)

*Primary Examiner* — Thai Q Tran
*Assistant Examiner* — Syed Y Hasan
(74) *Attorney, Agent, or Firm* — Leydig, Voit & Mayer, Ltd.

(57) ABSTRACT

Embodiments of the present invention provide a method for synchronous playback by multiple smart devices, and an apparatus. A first device acquires frame synchronization information at intervals of a preset time, and sends the frame synchronization information to one or more second devices, where the frame synchronization information is frame information of a frame to be played by the first device or frame information of a frame that the first device starts to play currently; and after learning the frame synchronization information sent by the first device, the second device adjusts frame resources played by itself. Because the multiple smart devices that perform synchronous playback are generally in one local area network, a transmission delay of frame information from the first device to the second device can be ignored, thereby improving a synchronization effect among the multiple smart devices.

9 Claims, 5 Drawing Sheets

(51) Int. Cl.
*H04N 21/414* (2011.01)
*H04N 21/43* (2011.01)
*H04N 21/436* (2011.01)
*H04L 7/08* (2006.01)
*G11B 20/10* (2006.01)
*H04L 29/06* (2006.01)

(52) U.S. Cl.
CPC ......... *H04N 5/06* (2013.01); *H04N 21/41407* (2013.01); *H04N 21/4307* (2013.01); *H04N 21/43615* (2013.01); *G11B 2020/10944* (2013.01); *H04L 65/40* (2013.01)

(58) Field of Classification Search
CPC .... G11B 20/10527; G11B 2220/10944; G11B 15/1875; G11B 7/031; H04L 12/3828; H04L 7/0008; H04W 56/00; H04J 3/0685
USPC ........ 386/201, 219, 280, 282; 709/201, 218, 709/248; 375/354; 370/503; 348/53
See application file for complete search history.

(56) References Cited

U.S. PATENT DOCUMENTS

| | | | |
|---|---|---|---|
| 8,364,005 B2* | 1/2013 | Lee | H04N 21/4307 386/201 |
| 2005/0166135 A1 | 7/2005 | Burke et al. | |
| 2006/0236352 A1 | 10/2006 | Scott, III et al. | |
| 2007/0086487 A1* | 4/2007 | Yasuda | H04J 3/0664 370/503 |
| 2008/0085098 A1 | 4/2008 | Ullmann | |
| 2010/0259603 A1* | 10/2010 | Mihara | G09G 3/003 348/53 |
| 2011/0196918 A1 | 8/2011 | Kkunigita et al. | |
| 2011/0218656 A1 | 9/2011 | Bishop et al. | |
| 2013/0007819 A1 | 1/2013 | Choi et al. | |
| 2013/0042018 A1 | 2/2013 | Maeng et al. | |
| 2013/0110900 A1* | 5/2013 | Des Jardins | H04N 21/4307 709/201 |
| 2015/0120958 A1 | 4/2015 | Zou et al. | |

FOREIGN PATENT DOCUMENTS

| | | |
|---|---|---|
| CN | 102170584 A | 8/2011 |
| CN | 102227142 A | 10/2011 |
| CN | 102752642 A | 10/2012 |
| CN | 102970589 A | 3/2013 |
| CN | 103475908 A | 12/2013 |
| CN | 103533388 A | 1/2014 |
| CN | 103534679 A | 1/2014 |
| JP | 2001203982 A | 7/2001 |
| JP | 2008519470 A | 6/2008 |
| JP | 2008539611 A | 11/2008 |
| JP | 2010183237 A | 8/2010 |
| KR | 20070057925 A | 6/2007 |
| KR | 101352768 B1 | 1/2014 |
| WO | WO 2004032507 A1 | 4/2004 |
| WO | WO 2006040723 A1 | 4/2006 |
| WO | WO 2010023828 A1 | 3/2010 |
| WO | WO 2011053010 A2 | 5/2011 |
| WO | WO 2011109439 A2 | 9/2011 |

* cited by examiner

METHOD FOR SYNCHRONOUS PLAYBACK BY MULTIPLE SMART DEVICES, AND APPARATUS

CROSS-REFERENCE TO RELATED APPLICATIONS

This application claims priority to Chinese Patent Application No. 201410042473.8, filed on Jan. 28, 2014, which is hereby incorporated by reference in its entirety.

TECHNICAL FIELD

Embodiments of the present invention relate to communications technologies, and in particular, to a method for synchronous playback by multiple smart devices, and an apparatus.

BACKGROUND

With the popularization of smart devices, a growing number of cooperative applications exist among multiple smart devices. For example, multiple smartphones access a social network or a local area network for music sharing, and each smartphone plays same content, achieving a louder sound playback effect; or each smartphone plays a different sound channel of music, bringing stereo music enjoyment; or the multiple smartphones share a video and play the video synchronously to achieve synchronous experience. All these require playback synchronization among the multiple smart devices.

In the prior art, a clock server sends a synchronization clock to each smart device, which requires synchronous playback, for time alignment so as to ensure that a clock of each smart device is synchronized, thereby achieving synchronous playback by multiple smart devices.

However, for the method in the prior art, although clock synchronization is performed, due to different hardware performance of smart devices of different types, video decoding speeds may be different; and a difference in precision of audio and video synchronization control may cause a frame level to be unsynchronized, when a video or audio of each device displays a same frame. As a result, a synchronization effect among the smart devices is poor.

SUMMARY

Embodiments of the present invention provide a method for synchronous playback by multiple smart devices, and an apparatus, so as to improve a synchronization effect among the multiple smart devices.

A first aspect of the embodiments of the present invention provides a method for synchronous playback by multiple smart devices, including:

acquiring, by a first device, frame synchronization information at intervals of a preset time; and sending, by the first device, the frame synchronization information to at least one second device, so that the second device performs playback according to the frame synchronization information.

With reference to the first aspect, in a first possible implementation manner of the first aspect, the frame synchronization information includes frame information of a frame to be played by the first device, and after the sending, by the first device, the frame synchronization information to at least one second device, the method further includes:

playing, by the first device, the frame to be played.

With reference to the first possible implementation manner of the first aspect, in a second possible implementation manner of the first aspect, before the playing, by the first device, the frame to be played, the method further includes:

receiving, by the first device, frame synchronization confirmation information sent by the second device, where the frame synchronization confirmation information is used to instruct the first device to play the frame to be played.

With reference to the first aspect, in a third possible implementation manner of the first aspect, the frame synchronization information includes frame information of a frame that the first device starts to play currently, and the sending, by the first device, the frame synchronization information to at least one second device, so that the second device performs playback according to the frame synchronization information, includes:

sending, by the first device, the frame information of the frame that the first device starts to play currently to the at least one second device, so that the second device plays, according to the fame information of the frame that starts to be played currently, the frame that starts to be played currently.

With reference to the third possible implementation manner of the first aspect, in a fourth possible implementation manner of the first aspect, after the sending, by the first device, the frame information of the frame that the first device starts to play currently to the at least one second device, the method further includes:

if the first device receives, within a preset time, frame synchronization confirmation information sent by the second device, playing, by the first device, a next frame after waiting until playback of the frame that starts to be played currently is complete, where the preset time is a playback time of one frame; and if the first device receives, after the preset time, the frame synchronization confirmation information of the second device, directly playing, by the first device, the next frame.

With reference to the first aspect, or any possible implementation manner of the first to fourth possible implementation manners of the first aspect, in a fifth possible implementation manner of the first aspect, before the acquiring, by a first device, frame synchronization information at intervals of a preset time, the method further includes:

sending, by the first device, a playback preparation instruction to the at least one second device, where the playback preparation instruction includes address information of a media resource to be played, so that the second device acquires, according to the address information of the media resource to be played, the media resource to be played; and receiving, by the first device, preparation completion information sent by the second device, where the preparation completion information is used to instruct the first device to acquire the frame synchronization information at intervals of the preset time.

With reference to the fifth possible implementation manner of the first aspect, in a sixth possible implementation manner of the first aspect, before the sending, by the first device, a playback preparation instruction to the at least one second device, the method further includes:

receiving, by the first device, synchronous playback request information sent by the second device.

A second aspect of the embodiments of the present invention provides a method for synchronous playback by multiple smart devices, including:

receiving, by a second device, frame synchronization information sent by a first device at intervals of a preset time; and performing, by the second device, playback according to the frame synchronization information.

With reference to the second aspect, in a first possible implementation manner of the second aspect, the frame synchronization information includes frame information of a frame to be played by the first device, and the performing, by the second device, playback according to the frame synchronization information includes:

playing, by the second device according to the frame information of the frame to be played, the frame to be played.

With reference to the first possible implementation manner of the second aspect, in a second possible implementation manner of the second aspect, before the playing, by the second device according to the frame information of the frame to be played, the frame to be played, the method further includes:

sending, by the second device, frame synchronization confirmation information to the first device, so that the first device plays, according to the frame synchronization confirmation information, the frame to be played.

With reference to the second aspect, in a third possible implementation manner of the second aspect, the frame synchronization information is frame information of a frame that the first device starts to play currently, and the performing, by the second device, playback according to the frame synchronization information includes:

playing, by the second device according to the frame information of the frame that starts to be played currently, the frame that starts to be played currently.

With reference to the third possible implementation manner of the second aspect, in a fourth possible implementation manner of the second aspect, before the playing, by the second device according to the frame information of the frame that starts to be played currently, the frame that starts to be played currently, the method further includes:

sending, by the second device, frame synchronization confirmation information to the first device, so that the first device determines, according to the frame synchronization confirmation information, time to play a next frame.

With reference to any possible implementation manner of the first to fourth possible implementation manners of the second aspect, in a fifth possible implementation manner of the second aspect, before the receiving, by a second device, frame synchronization information sent by a first device at intervals of a preset time, the method further includes:

receiving, by the second device, a playback preparation instruction sent by the first device, where the playback preparation instruction includes address information of a media resource to be played;

acquiring, by the second device according to the address information of the media resource to be played, the media resource to be played; and sending, by the second device, preparation completion information to the first device.

With reference to the fifth possible implementation manner of the second aspect, in a sixth possible implementation manner of the second aspect, before the receiving, by the second device, a playback preparation instruction sent by the first device, the method further includes:

sending, by the second device, synchronous playback request information to the first device, so that the first device sends, according to the synchronous playback request information, the playback preparation instruction to the second device.

A third aspect of the embodiments of the present invention provides an smart device, where the smart device is a first device and includes:

an acquirer, configured to acquire frame synchronization information at intervals of a preset time; and a transmitter, configured to send the frame synchronization information to at least one second device, so that the second device performs playback according to the frame synchronization information.

With reference to the third aspect, in a first possible implementation manner of the third aspect, the frame synchronization information includes frame information of a frame to be played by the first device, and the apparatus further includes: a player, configured to play, when the transmitter completes sending the frame synchronization information to the at least one second device, the frame to be played.

With reference to the first possible implementation manner of the third aspect, in a second possible implementation manner of the third aspect, the apparatus further includes a receiver, where the receiver is configured to receive frame synchronization confirmation information sent by the second device, and the frame synchronization confirmation information is used to instruct the player to play the frame to be played; and the player is specifically configured to play, when the receiver receives the frame synchronization confirmation information, the frame to be played.

With reference to the third aspect, in a third possible implementation manner of the third aspect, the frame synchronization information includes frame information of a frame that the first device starts to play currently, and the transmitter is specifically configured to send, to the at least one second device, the frame information of the frame that the first device starts to play currently, so that the second device plays, according to the frame information of the frame that starts to be played currently, the frame that starts to be played currently.

With reference to the third possible implementation manner of the third aspect, in a fourth possible implementation manner of the third aspect, the player is further configured to: when the transmitter completes sending, to the at least one second device, the frame information of the frame that the first device starts to play currently, if frame synchronization confirmation information sent by the second device is received within a preset time, play a next frame after the player waits for playback of the frame that starts to be played currently to finish, where the preset time is a playback time of one frame; and if the frame synchronization confirmation information of the second device is received after the preset time, directly play, by the player, the next frame.

With reference to the third aspect, or any possible implementation manner of the first to fourth possible implementation manners of the third aspect, in a fifth possible implementation manner of the third aspect, the transmitter is further configured to send a playback preparation instruction to the at least one second device, where the playback preparation instruction includes address information of a media resource to be played, so that the second device acquires, according to the address information of the media resource to be played, the media resource to be played;

the receiver is further configured to receive, when the transmitter completes sending the playback preparation instruction to the at least one second device, preparation completion information sent by the second device, where the preparation completion information is used to instruct the first device to acquire the frame synchronization information at intervals of the preset time; and the acquirer is specifically configured to acquire the frame synchronization information at intervals of the preset time when the receiver receives the preparation completion information sent by the second device.

With reference to the fifth possible implementation manner of the third aspect, in a sixth possible implementation manner of the third aspect, the receiver is further configured to receive synchronous playback request information sent by the second device; and the transmitter is specifically configured to send the playback preparation instruction to the at least one second device when the receiver receives the synchronous playback request information.

A fourth aspect of the embodiments of the present invention provides an smart device, where the smart device is a second device and includes:

a receiver, configured to receive frame synchronization information sent by a first device at intervals of a preset time; and a player, configured to perform playback according to the frame synchronization information when the receiver receives the frame synchronization information.

With reference to the fourth aspect, in a first possible implementation manner of the fourth aspect, the frame synchronization information includes frame information of a frame to be played by the first device, and the player is specifically configured to play, according to the frame information of the frame to be played, the frame to be played.

With reference to the first possible implementation manner of the fourth aspect, in a second possible implementation manner of the fourth aspect, the apparatus further includes: a transmitter, configured to send frame synchronization confirmation information to the first device, so that the first device plays, according to the frame synchronization confirmation information, the frame to be played, where the player is configured to start to play, according to the frame information of the frame to be played, when the transmitter completes the frame synchronization confirmation information, the frame to be played.

With reference to the fourth aspect, in a third possible implementation manner of the fourth aspect, the frame synchronization information is frame information of a frame that the first device starts to play currently, and the player is specifically configured to play, according to the frame information of the frame that starts to be played currently, the frame that starts to be played currently.

With reference to the third possible implementation manner of the fourth aspect, in a fourth possible implementation manner of the fourth aspect, the apparatus further includes: a transmitter, configured to send frame synchronization confirmation information to the first device, so that the first device determines, according to the frame synchronization confirmation information, time to play a next frame; where the player is specifically configured to play, according to the frame information of the frame that starts to be played currently, when the transmitter completes sending the frame synchronization confirmation information, the frame that starts to be played currently.

With reference to any possible implementation manner of the first to fourth possible implementation manners of the fourth aspect, in a fifth possible implementation manner of the fourth aspect, the receiver is further configured to receive a playback preparation instruction sent by the first device, where the playback preparation instruction includes address information of a media resource to be played;

the player is further configured to acquire, according to the address information of the media resource to be played, when the receiver receives the playback preparation instruction, the media resource to be played;

the transmitter is further configured to send preparation completion information to the first device when the player acquires the media resource to be played; and the receiver is specifically configured to receive, when the transmitter completes sending the preparation completion information, the frame synchronization information sent by the first device at intervals of the preset time.

With reference to the fifth possible implementation manner of the fourth aspect, in a sixth possible implementation manner of the fourth aspect, the transmitter is further configured to send synchronous playback request information to the first device, so that the first device sends the playback preparation instruction to the second device according to the synchronous playback request information; and the receiver is further configured to receive, when the transmitter completes sending the synchronous playback request information, the playback preparation instruction sent by the first device.

The embodiments of the present invention provide a method for synchronous playback by multiple smart devices, and an apparatus. A first device acquires frame synchronization information at intervals of a preset time, and sends the frame synchronization information to one or more second devices, where the frame synchronization information is frame information of a frame to be played by the first device or frame information of a frame that the first device starts to play currently; and after learning the frame synchronization information sent by the first device, the second device adjusts frame resources played by itself. Because the multiple smart devices that perform synchronous playback are generally in one local area network, a transmission delay of frame information from the first device to the second device can be ignored, thereby improving a synchronization effect among the multiple smart devices.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In an application scenario of synchronous playback by multiple smart devices, it is determined that one of the smart devices is a first device (primary device), and another smart device that requires synchronous playback is a second device (secondary device). In the embodiments of the present invention, the first device acquires frame synchronization information at intervals of a preset time, and sends the frame synchronization information to one or more second devices, where the frame synchronization information is frame information of a frame to be played by the first device or frame information of a frame that the first device starts to play currently, so that the second device performs playback according to the frame synchronization information, thereby improving a synchronization effect among the multiple smart devices.

The following describes in detail technical solutions of the present invention with reference to several specific embodiments. Specifically, the technical solutions of the present invention are separately introduced according to classification of frame information situations: a situation in which the frame synchronization information is frame information of a frame to be played by a first device and a situation in which the frame synchronization information is frame information of a frame that a first device starts to play currently. The following several specific embodiments may serve as reference for each other, and for a same or similar concept or process, details may not be described repetitively in some embodiments.

Figure 1:
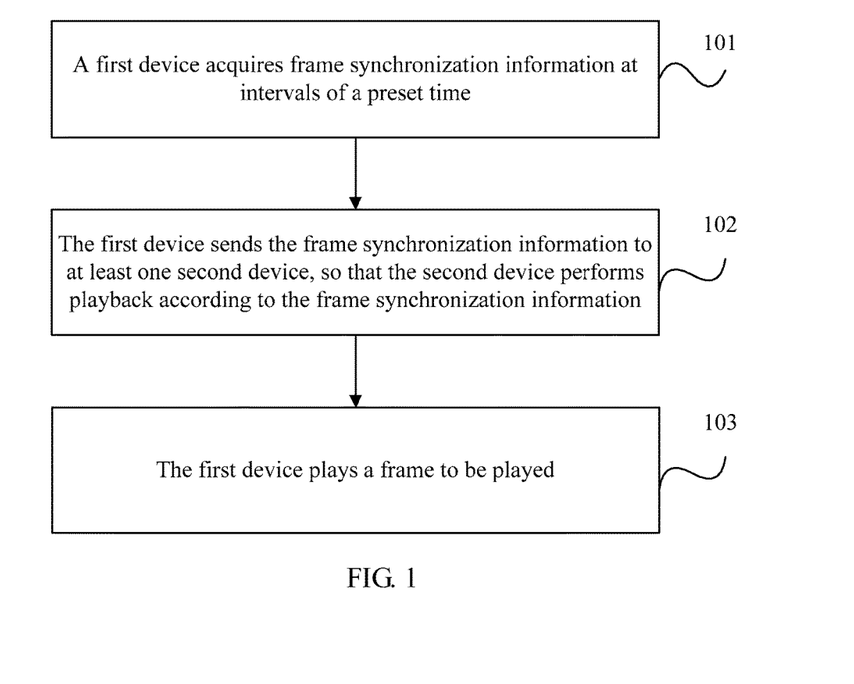
FIG. 1 is a schematic flowchart of Embodiment 1 of a method for synchronous playback by multiple smart devices according to the present invention.

FIG. 1 is a schematic flowchart of Embodiment 1 of a method for synchronous playback by multiple smart devices according to the present invention. As shown in FIG. 1, this embodiment is executed by a first device in a situation in which frame synchronization information is frame information of a frame to be played by the first device. The method in this embodiment includes:

S101: The first device acquires frame synchronization information at intervals of a preset time.

The frame synchronization information is frame information of a frame to be played by the first device. The frame to be played by the first device refers to a frame that the first device prepares to play but does not play yet while the first device has acquired a resource of the frame. The frame information includes time information and/or number information, for example, a timestamp and/or a frame number. On the whole, in a media resource, the frame information may include any frame information that can uniquely identify frame information of a frame, which is not limited in the present invention.

S102: The first device sends the frame synchronization information to at least one second device, so that the second device performs playback according to the frame synchronization information.

The at least one second device plays, according to the frame information of the frame to be played, the frame to be played. That is, when preparing to play a frame, the first device sends at intervals of the preset time the frame information of the frame that the first device prepares to play to one or more second devices that require synchronous playback, and the one or more second devices adjust, according to the frame information of the frame to be played, frame resources played by themselves so as to play a frame corresponding to the frame information.

Optionally, the method further includes step S103: The first device plays the frame to be played.

After sending the frame synchronization information to the at least one second device, the first device plays the frame to be played, that is, plays a frame corresponding to the frame information.

In this embodiment, because a first device acquires frame synchronization information at intervals of a preset time, and sends the frame synchronization information to at least one second device, where the frame synchronization information is frame information of a frame to be played by the first device, the at least one second device plays, according to the frame information of the frame to be played, the frame to be played, and the first device plays the frame to be played. That is, when preparing to play a frame, the first device first sends frame information of the frame at intervals of the preset time to the second device that requires synchronous playback; after learning the frame that the first device prepares to play, the second device adjusts frame resources played by itself, so as to play a frame corresponding to the frame information sent by the first device; and after sending the frame information, the first device also starts to play the frame corresponding to the frame information. Because multiple smart devices that perform synchronous playback are generally in one local area network, a transmission delay of the frame information from the first device to the second device can be ignored, which is equivalent that the second device and the first device simultaneously play the frame corresponding to the frame information. Because the first device sends the frame information of the frame to be played to the second device at intervals of the preset time, when unsynchronized delays occur to the frame information played by the first device and the second device, an adjustment can be made in time, thereby improving a synchronization effect among the multiple smart devices. When a specific setting of the preset time interval meets a condition that the first device and the second device can ensure frame-level synchronization within the preset time interval after the first device sends the frame synchronization information, frame-level synchronization among the multiple smart devices can be achieved.

Figure 2:
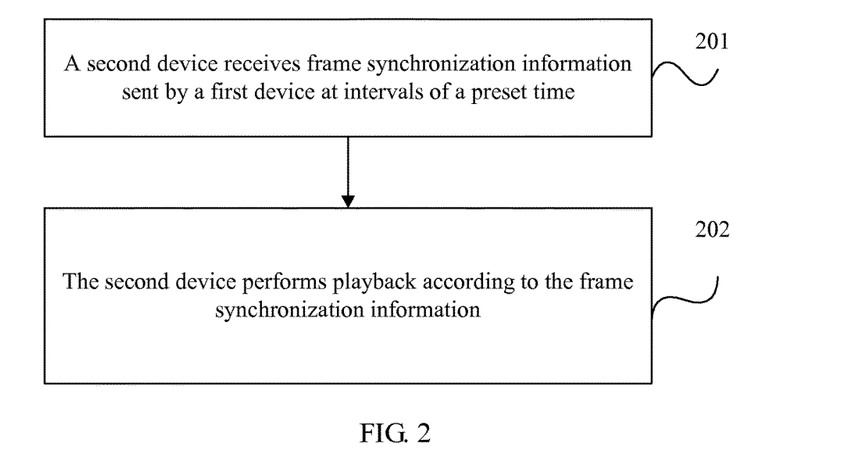
FIG. 2 is a schematic flowchart of Embodiment 2 of a method for synchronous playback by multiple smart devices according to the present invention.

FIG. 2 is a schematic flowchart of Embodiment 2 of a method for synchronous playback by multiple smart devices according to the present invention. As shown in FIG. 2, this embodiment is executed by a second device in a situation in which frame synchronization information is frame information of a frame to be played by a first device. The method in this embodiment includes:

S201: The second device receives frame synchronization information sent by the first device at intervals of a preset time.

The frame synchronization information is the frame information of the frame to be played by the first device. The second device receives frame synchronization information sent by the first device at intervals of a preset time, which is equivalent that the second device can learn, at intervals of the preset time, frame information of a frame that the first device prepares to play currently, and the second device can adjust, according to the frame information, a frame played by itself so as to play a same frame as the frame to be played by the first device.

S202: The second device performs playback according to the frame synchronization information.

The frame synchronization information may be frame information of the frame to be played. Then, step S202 is that the second device plays, according to the frame information of the frame to be played, the frame to be played.

In this embodiment, a second device receives frame synchronization information sent by a first device at intervals of a preset time, which is equivalent that the second device can learn, at intervals of the preset time, frame information of a frame that the first device prepares to play currently, and the second device plays, according to the frame information of the frame to be played, the frame to be played. Because multiple smart devices that perform synchronous playback are generally in one local area network, a transmission delay of the frame information from the first device to the second device can be ignored, which is equivalent that the second device and the first device simultaneously play a frame corresponding to the frame information. Because the first device sends the frame information of the frame to be played to the second device at intervals of the preset time, when unsynchronized delays occur to the frame information played by the first device and the second device, an adjustment can be made in time, thereby improving a synchronization effect among the multiple smart devices. When a specific setting of the preset time interval meets a condition that the first device and the second device can ensure frame-level synchronization within the preset time interval after the first device sends the frame synchronization information, frame-level synchronization among the multiple smart devices can be achieved.

Figure 3:
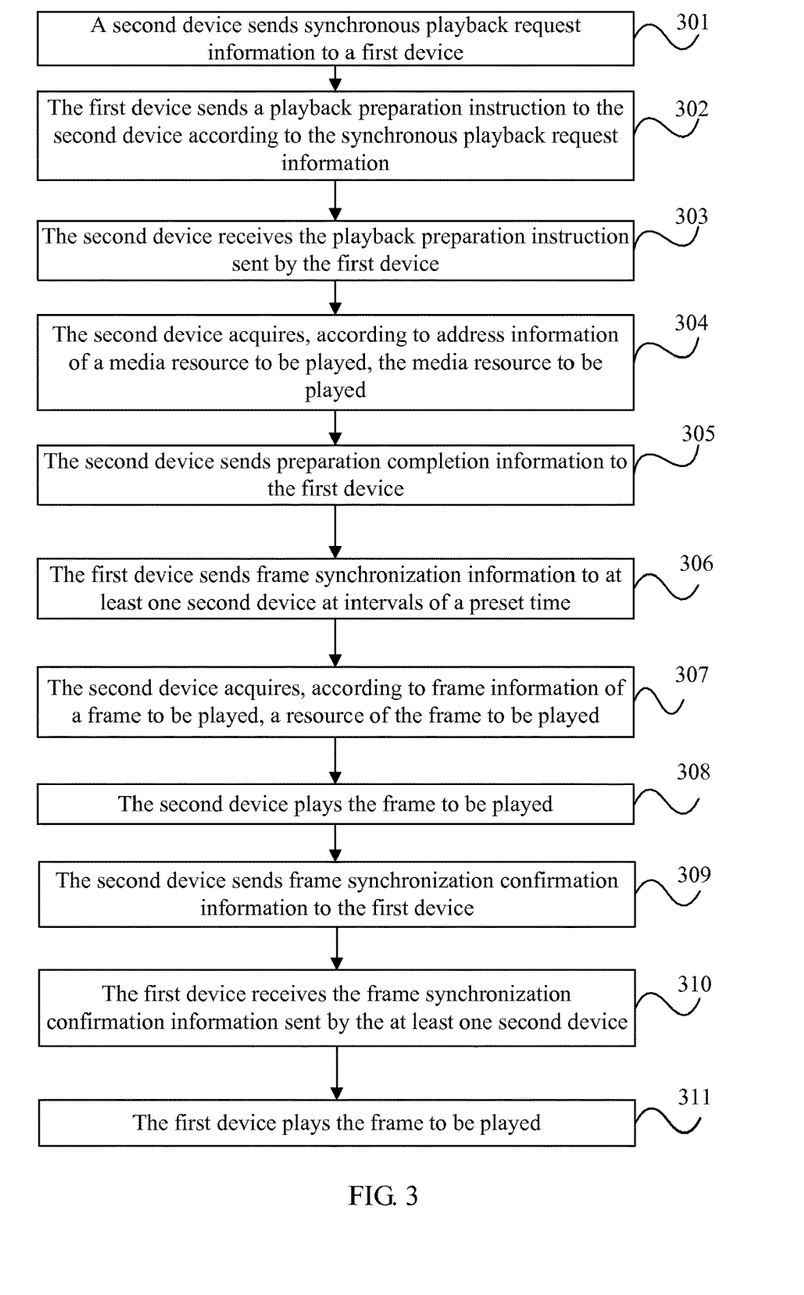
FIG. 3 is a schematic flowchart of Embodiment 3 of a method for synchronous playback by multiple smart devices according to the present invention.

FIG. 3 is a schematic flowchart of Embodiment 3 of a method for synchronous playback by multiple smart devices according to the present invention. As shown in FIG. 3, this embodiment is described for a situation in which frame synchronization information is frame information of a frame to be played by a first device. The method in this embodiment includes:

S301: A second device sends synchronous playback request information to the first device.

A second device that needs to join in synchronous playback may perform synchronous playback by sending synchronous playback request information to the first device. This step is an optional step, and the first device may also learn, in another manner, information about a second device that requires synchronous playback. For example, information about a second device that performs synchronous playback is set in the first device beforehand, and then the second device does not need to actively send synchronous playback request information to the first device to request to perform synchronous playback, which is not limited in the present invention.

After receiving the synchronous playback request information sent by the second device, the first device performs S302.

S302: The first device sends a playback preparation instruction to the second device according to the synchronous playback request information.

The first device determines, according to the synchronous playback request information, a second device that needs to perform synchronous playback, and the first device sends the playback preparation instruction to all second devices that request synchronous playback.

The playback preparation instruction includes address information of a media resource to be played, and the media resource to be played may be stored in the first device, or the second device, or a third device. On the whole, the first device and the second device can acquire, according to the address information of the media resource to be played, the media resource to be played, which is not limited in the present invention. At least one second device acquires, according to the address information of the media resource to be played, the media resource to be played, where the media resource to be played refers to an entire media resource to be played. For example, the entire media resource to be played is a video file A; the first device may send a storage path of the video file A to the second device; and the second device may acquire a media resource of the video file A according to the storage path, and perform some preparations such as decoding and buffering the video file A.

In addition to the address information of the media resource to be played, a start time point of playback, video display indication information, audio playback indication information, and/or subtitles display indication information may further be included in the playback preparation instruction. The video display indication information is used to indicate how a video is displayed on the second device, for example, displaying a part of an original video, displaying in a picture-in-picture mode, full-screen display, proportional display, full width, full height, displaying on the left, displaying on the right, displaying near the top, displaying near the bottom, or indication of another video display position. The audio playback indication information is used to indicate how audio is played, for example, playing a sound channel, some sound channels, or volume setting. The subtitles display indication information is used to indicate how subtitles are displayed, for example, displaying Chinese subtitles, displaying English subtitles, displaying multiple types of subtitles, displaying a part of subtitles, or a part of display positions of subtitles. According to the start time point of playback, the video display indication information, the audio playback indication information, and/or the subtitles display indication information, the second device may accordingly set the start time point of playback, a video display manner, an audio display manner, and/or a subtitles display manner.

S303: The second device receives the playback preparation instruction sent by the first device.

Content of the playback preparation instruction is the same as that in S302 and is not described herein again.

S304: The second device acquires, according to address information of the media resource to be played, the media resource to be played.

When the playback preparation instruction further includes the start time point of playback, the video display indication information, the audio playback indication information, and/or the subtitles display indication information, according to the start time point of playback, the video display indication information, the audio playback indication information, and/or the subtitles display indication information, the second device may accordingly set the start time point of playback, the video display manner, the audio display manner, and/or the subtitles display manner.

S305: The second device sends preparation completion information to the first device.

The first device is enabled to send the frame synchronization information to the at least one second device at intervals of a preset time. After receiving the preparation completion information, the first device performs step S306.

It can be understood that S302 to S305 are optional steps. Before S306 is performed, the first device and the second device may also prepare, in another manner, the media resource to be played, and it may be unnecessary that the first device sends the playback preparation instruction to the second device to instruct the second device to prepare to play the resource, and that the second device sends the preparation completion information to the first device to inform the first device that the second device has completed the preparation. For example, before S306 is performed, a user may input a preparation instruction, so that the first device and the second device prepare the media resource to be played.

After receiving preparation completion information sent by all second devices that perform synchronous playback with the first device, the first device performs S306.

S306: The first device sends frame synchronization information to at least one second device at intervals of a preset time.

The frame synchronization information is frame information of a frame to be played by the first device. The frame information of the frame to be played may be a timestamp and/or a frame number of the frame to be played, where either the timestamp or the frame number can uniquely identify a frame. Preset time intervals are intervals of an equal time period or intervals of unequal time periods. The preset time interval may be a period of time, or may be a specific quantity of frames; the period of time may be fixed or be variable; and the specific quantity of frames may be one frame or multiple frames, and may also be fixed or variable. For example, the first device sends the frame synchronization information to the second device once every 30 ms, or sends the frame synchronization information to the second device once every a random time. A specific time interval may be an empirical value, for example, every time after the frame synchronization information is sent, frame-level synchronization can be ensured within 300 ms, and then the time interval may be set to a value within 300 ms. A value range of the time interval is related to a performance difference between devices. Alternatively, frame information of a next frame that the first device prepares to play is sent to the second device once every time N frames are played, where N is an integer greater than or equal to 1, and a greatest value of N may be an empirical value. For example, it can be learned by experiment that after the frame synchronization information is sent every time, both the first device and the second device can ensure frame-level synchronization within 10 frames, and then a value of N may be set to an integer less than 10. A value range of N is related to a performance difference between devices. The preset time interval is greater than or equal to a playback time of one frame, and preferably, the preset time interval is a playback time of one frame or an interval of one frame. The interval of one frame in the present invention means that an interval between consecutive sending of synchronization information is an interval of the playback time of one frame.

S307: The second device acquires, according to frame information of a frame to be played, a resource of the frame to be played.

Specifically, according to the frame information of the frame to be played, the second device determines a relationship between a frame that the second device waits to play and the frame to be played, that is, determines a relationship between a frame that the second device waits to play currently and a frame that the first device prepares to play currently, which is classified into the following situations:

If the frame that the second device waits to play is a frame before the frame to be played by the first device, go fast forward or jump to the frame to be played and acquire a resource of the frame to be played.

If the frame that the second device waits to play is the frame to be played by the first device, acquire a resource of the frame to be played.

If the frame that the second device waits to play is a frame after the frame to be played by the first device, go back forward or jump to the frame to be played and acquire a resource of the frame to be played.

S308: The second device plays the frame to be played.

S309: The second device sends frame synchronization confirmation information to the first device.

The frame synchronization confirmation information is used to instruct the first device to play the frame to be played.

S310: The first device receives the frame synchronization confirmation information sent by the at least one second device.

After receiving the frame synchronization confirmation information sent by all second devices, the first device performs S311.

S311: The first device plays the frame to be played.

After the second device has performed step S307, in a first implementation manner, the second device may first perform S308 and then perform S309. In a second implementation manner, the second device may first perform S309 and then perform S308.

A difference between the first implementation manner and the second implementation manner lies in the following: in the first implementation manner, the second device acquires the resource of the frame to be played, that is, a resource of a frame determined according to the frame information sent by the first device; afterward, the second device first plays the frame determined according to the frame information, and then sends the frame synchronization confirmation information to the first device; and after receiving the frame synchronization confirmation information, the first device plays the frame to be played, that is, plays the same frame resource with the second device. If a transmission time of the frame synchronization confirmation information between the first device and the second device is ignored, because a device needs to invoke a playback interface before performing playback and it takes time to invoke the playback interface, compared with the second device, the first device delays time of invoking the playback interface in the first implementation manner. However, in the second implementation manner, after the second device acquires the resource of the frame to be played, the second device first sends the frame synchronization confirmation information to the first device, and then plays the frame determined according to the frame information. If a transmission time of the frame synchronization confirmation information between the first device and the second device is ignored, it is equivalent that the first device and the second device simultaneously play frame information of a same frame; and therefore, frame-level synchronization can be achieved more accurately in the second implementation manner.

In this embodiment, a first device sends frame synchronization information to at least one second device at intervals of a preset time, where the frame synchronization information is frame information of a frame to be played by the first device; and after receiving the frame synchronization information sent by the first device, the second device acquires, according to the frame information of the frame to be played, a resource of the frame to be played, and sends frame synchronization confirmation information to the first device. Because the first device plays the frame to be played after receiving frame synchronization confirmation information sent by all second devices, a delay of frame playback between second devices can be decreased by means of multiple frame synchronization operations; and therefore, it can be achieved that devices adjust frames they play after receiving the frame information, thereby improving a synchronization effect among the multiple smart devices.

In the foregoing embodiment, steps S309 to S310 are optional steps, and the first device may also play the foregoing frame to be played, after sending the frame synchronization information to the second device. The second device may also not send the frame synchronization confirmation information to the first device, so as to reduce communication interaction between devices and reduce impact of a device with poor performance on another device.

Figure 4:
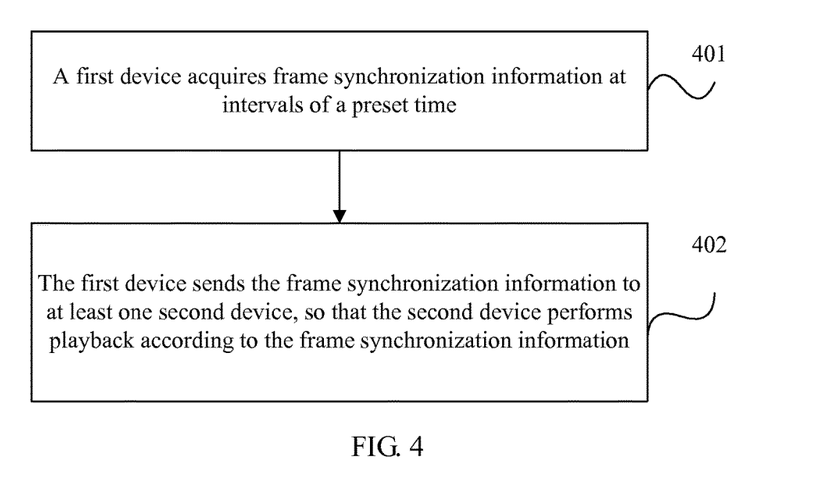
FIG. 4 is a schematic flowchart of Embodiment 4 of a method for synchronous playback by multiple smart devices according to the present invention.

FIG. 4 is a schematic flowchart of Embodiment 4 of a method for synchronous playback by multiple smart devices according to the present invention. As shown in FIG. 4, this embodiment is executed by a first device in a situation in which frame synchronization information is frame information of a frame that the first device starts to play currently. The method in this embodiment includes:

S401: The first device acquires frame synchronization information at intervals of a preset time.

The frame synchronization information is frame information of a frame that the first device starts to play currently. The frame information includes time information and/or number information, for example, a timestamp and/or a frame number. On the whole, in a media resource, the frame information may include any frame information that can uniquely identify frame information of a frame, which is not limited in the present invention. In the present invention, acquiring the frame synchronization information at intervals of the preset time is a preferable choice; and certainly, the frame synchronization information may also be acquired at intervals less than or greater than the preset time interval, which may cause that the frame synchronization information is acquired too frequently or the frame synchronization information is not accurate enough, or the like. This explanation is applicable to this embodiment and other embodiments.

S402: The first device sends the frame synchronization information to at least one second device, so that the second device performs playback according to the frame synchronization information.

After receiving the frame synchronization information sent by the first device, the second device plays, according to the frame information of the frame that starts to be played currently, the frame that starts to be played currently. That is, after starting to play a frame, the first device sends frame information of the frame that starts to be played to one or more second devices at intervals of the preset time, and the one or more second devices adjust, according to the frame information of the frame to be played, frame resources played by themselves so as to play a frame corresponding to the frame information.

In this embodiment, after starting to play a frame, a first device sends frame information of a frame that starts to be played currently to at least one second device; and after learning the frame that the first device starts to play currently, a second device adjusts frame resources played by itself so as to play a frame corresponding to the frame information sent by the first device. Because multiple smart devices that perform synchronous playback are generally in one local area network, a transmission delay of the frame information from the first device to the second device can be ignored, which is equivalent that the second device and the first device simultaneously play the frame corresponding to the frame information. Because the first device sends frame information of a frame to be played to the second device at intervals of a preset time, when unsynchronized delays occur to the frame information played by the first device and the second device, an adjustment can be made in time to achieve frame-level synchronization, thereby improving a synchronization effect among the multiple smart devices. When a specific setting of the preset time interval meets a condition that the first device and the second device can ensure frame-level synchronization within the preset time interval after the first device sends the frame synchronization information, frame-level synchronization among the multiple smart devices can be achieved.

Figure 5:
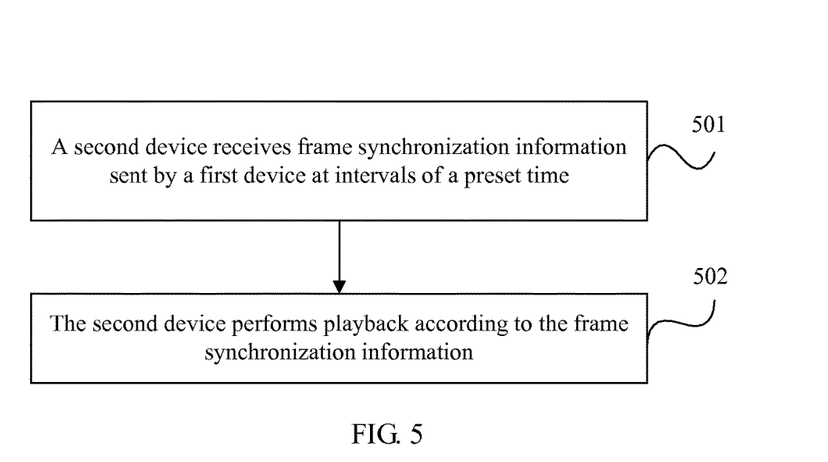
FIG. 5 is a schematic flowchart of Embodiment 5 of a method for synchronous playback by multiple smart devices according to the present invention.

FIG. 5 is a schematic flowchart of Embodiment 5 of a method for synchronous playback by multiple smart devices according to the present invention. As shown in FIG. 5, this embodiment is executed by a second device in a situation in which frame synchronization information is frame information of a frame that a first device starts to play currently. The method in this embodiment includes:

S501: The second device receives frame synchronization information sent by the first device at intervals of a preset time.

The frame synchronization information is frame information of a frame that the first device starts to play currently. That is, at the moment the first device starts to play a frame, the first device sends frame synchronization information of the frame that starts to be played currently to the second device. The frame information includes time information and/or number information, for example, a timestamp and/or a frame number. On the whole, in a media resource, the frame information may include any frame information that can uniquely identify frame information of a frame, which is not limited in the present invention.

S502: The second device performs playback according to the frame synchronization information.

The frame synchronization information is the frame information of the frame that starts to be played currently. Step 502 is that the second device plays, according to the frame information of the frame that starts to be played currently, the frame that starts to be played currently.

After receiving the frame synchronization information sent by the first device, the second device plays, according to the frame information of the frame that starts to be played currently, the frame that starts to be played currently. That is, after starting to play a frame, the first device sends frame information of the frame that starts to be played to one or more second devices at intervals of the preset time, and the one or more second devices adjust, according to the frame information of the frame to be played, frame resources played by themselves so as to play a frame corresponding to the frame information (that is, the frame that the first device starts to play currently).

In this embodiment, after starting to play a frame, a first device sends frame information of a frame that starts to be played currently to at least one second device; and after learning the frame that the first device starts to play currently, a second device adjusts frame resources played by itself so as to play a frame corresponding to the frame information sent by the first device (that is, the frame that the first device starts to play currently). Because multiple smart devices that perform synchronous playback are generally in one local area network, a transmission delay of the frame information from the first device to the second device can be ignored, which is equivalent that the second device and the first device simultaneously play the frame corresponding to the frame information. Because the first device sends frame information of a frame to be played to the second device at intervals of a preset time, when unsynchronized delays occur to the frame information played by the first device and the second device, an adjustment can be made in time, thereby improving a synchronization effect among the multiple smart devices. When a specific setting of the preset time interval meets a condition that the first device and the second device can ensure frame-level synchronization within the preset time interval after the first device sends the frame synchronization information, frame-level synchronization among the multiple smart devices can be achieved.

Figure 6:
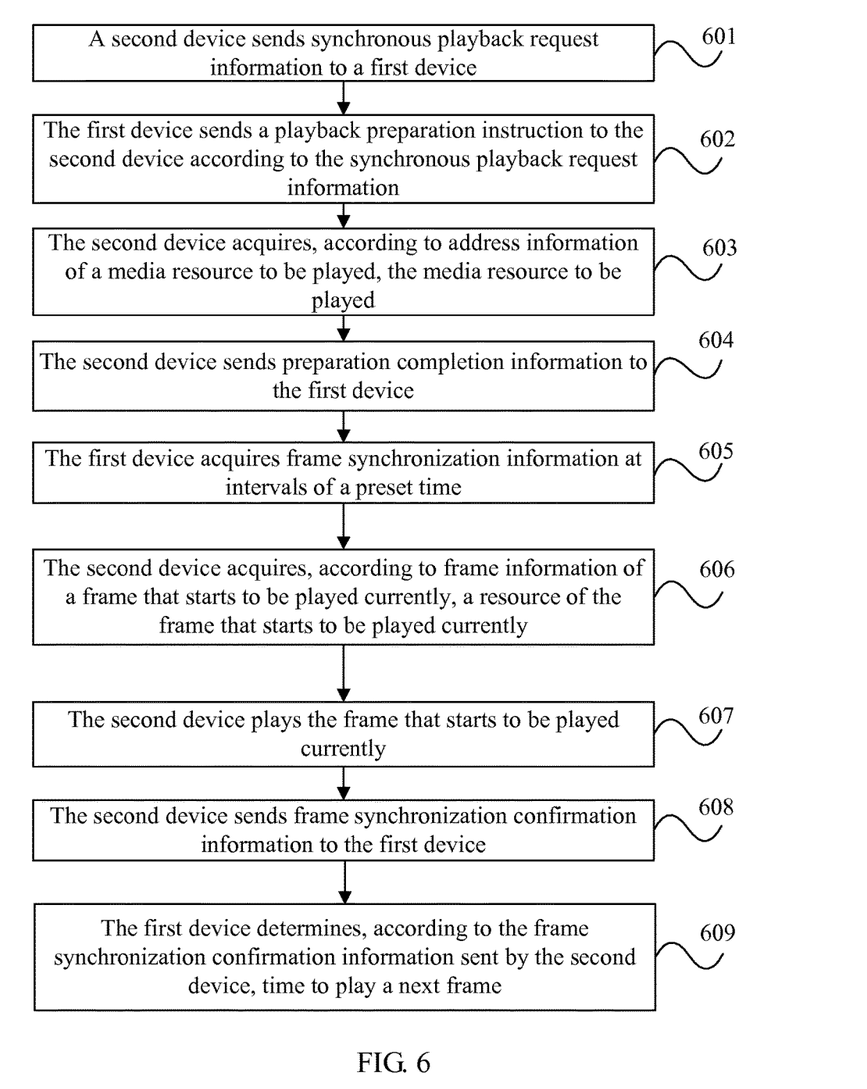
FIG. 6 is a schematic flowchart of Embodiment 6 of a method for synchronous playback by multiple smart devices according to the present invention.

FIG. 6 is a schematic flowchart of Embodiment 6 of a method for synchronous playback by multiple smart devices according to the present invention. As shown in FIG. 6, this embodiment is described in terms of a situation in which frame synchronization information is frame information of a frame that a first device starts to play currently. The method in this embodiment includes:

S601: A second device sends synchronous playback request information to the first device.

A second device that needs to join in synchronous playback may perform synchronous playback by sending the synchronous playback request information to the first device. This step is an optional step, and the first device may also learn, in another manner, information about the second device that requires synchronous playback. For example, if information about a second device that performs synchronous playback is set in the first device beforehand, the second device does not need to actively send the synchronous playback request information to the first device to request to perform synchronous playback, which is not limited in the present invention.

When the second device needs to join in synchronous playback after the first device already starts playback, the second device may also request to join in synchronous playback by sending a synchronous playback request to the first device, so that the first device acquires information about a second device that requests to join in synchronous playback.

After receiving the synchronous playback request information sent by the second device, the first device performs S602.

S602: The first device sends a playback preparation instruction to the second device according to the synchronous playback request information.

The first device determines, according to the synchronous playback request information, a second device that needs to perform synchronous playback, and the first device sends the playback preparation instruction to all second devices that request synchronous playback.

The playback preparation instruction includes address information of a media resource to be played, and at least one second device acquires, according to the address information of the media resource to be played, the media resource to be played. Herein, the media resource to be played refers to an entire media resource that starts to be played currently. For example, the entire media resource that starts to be played currently is a video file A; the first device may send a storage path of the video file A to the second device; and the second device may acquire a media resource of the video file A according to the storage path, and perform some preparations such as decoding and buffering the video file A.

In addition to the address information of the media resource to be played, a start time point of playback, video display indication information, audio playback indication information, and/or subtitles display indication information may further be included in the playback preparation instruction. The video display indication information is used to indicate how a video is displayed on the second device, for example, displaying a part of an original video, displaying in a picture-in-picture mode, full-screen display, proportional display, full width, full height, displaying on the left, displaying on the right, displaying near the top, displaying near the bottom, or indication of another video display position. The audio playback indication information is used to indicate how audio is played, for example, playing a sound channel, some sound channels, or volume setting. The subtitles display indication information is used to indicate how subtitles are displayed, for example, displaying Chinese subtitles, displaying English subtitles, displaying multiple types of subtitles, displaying a part of subtitles, or a part of display positions of subtitles. According to the start time point of playback, the video display indication information, the audio playback indication information, and/or the subtitles display indication information, the second device may accordingly set the start time point of playback, a video display manner, an audio display manner, and/or a subtitles display manner.

S603: The second device acquires, according to address information of the media resource to be played, the media resource to be played.

The playback preparation instruction further includes the start time point of playback, the video display indication information, the audio playback indication information, and/or the subtitles display indication information; and according to the start time point of current playback, the video display indication information, the audio playback indication information, and/or the subtitles display indication information, the second device may accordingly set the start time point of playback, the video display manner, the audio display manner, and/or the subtitles display manner.

S604: The second device sends preparation completion information to the first device.

The preparation completion information is used to instruct the first device to acquire the frame synchronization information at intervals of a preset time. After receiving the preparation completion information, the first device performs step S605.

It can be understood that S602 to S604 are optional steps. Before S605 is performed, the first device and the second device may also prepare, in another manner, the media resource to be played, and it may be unnecessary that the first device sends the playback preparation instruction to the second device to instruct the second device to prepare to play the resource, and that the second device sends the preparation completion information to the first device to inform the first device that the second device has completed the preparation. For example, before S605 is performed, a user may input a preparation instruction, so that the first device and the second device prepare the media resource to be played.

After receiving preparation completion information sent by all second devices that perform synchronous playback with the first device, the first device performs S605.

S605: The first device acquires the frame synchronization information at intervals of a preset time.

The frame synchronization information is the frame information of the frame that the first device starts to play currently. The frame information of the frame that starts to be played currently may be a timestamp and/or a frame number of the frame that starts to be played currently, where either the timestamp or the frame number can uniquely identify a frame. Preset time intervals are intervals of an equal time period or intervals of unequal time periods. The preset time interval may be a period of time, or may be a specific quantity of frames; the period of time may be fixed or be variable; and the specific quantity of frames may be one frame or multiple frames, and may also be fixed or variable. For example, the first device sends the frame synchronization information to the second device once every 30 ms, or sends the frame synchronization information to the second device once every a random time. A specific time interval may be an empirical value, for example, every time after the frame synchronization information is sent, frame-level synchronization can be ensured within 300 ms, and then the time interval may be set to a value within 300 ms. A value range of the time interval is related to a performance difference between devices. Alternatively, frame information of a next frame that the first device prepares to play is sent to the second device once every time N frames are played, where N is an integer greater than or equal to 1, and a greatest value of N may be an empirical value. For example, it can be learned by experiment that after the frame synchronization information is sent every time, both the first device and the second device can ensure frame-level synchronization within 10 frames, and then a value of N may be set to an integer less than 10. A value range of N is related to a performance difference between devices. The preset time interval is greater than or equal to a playback time of one frame, and preferably, the preset time interval is a playback time of one frame or an interval of one frame.

S606: The second device acquires, according to the frame information of the frame that starts to be played currently, a resource of the frame that starts to be played currently.

Specifically, according to the frame information of the frame that starts to be played currently, the second device determines a relationship between a frame that the second device waits to play and the frame that starts to be played currently, that is, determines a relationship between a frame that the second device waits to play currently and the frame that the first device starts to play currently, which is classified into the following situations:

If the frame that the second device waits to play is a frame before the frame that starts to be played currently, go fast forward or jump to the frame that starts to be played currently and acquire the frame resource.

If the frame that the second device waits to play is the frame that starts to be played currently, acquire the frame resource.

If the frame that the second device waits to play is a frame after the frame that starts to be played currently, go fast backward or jump to the frame that starts to be played currently and acquire the frame resource.

S607: The second device plays the frame that starts to be played currently.

S608: The second device sends frame synchronization confirmation information to the first device.

S609: The first device determines, according to the frame synchronization confirmation information sent by the second device, time to play a next frame.

Specifically, if all frame synchronization confirmation information is received within a preset time, the first device plays the next frame after waiting until playback of the frame that starts to be played currently is complete, where the preset time is a playback time of one frame.

If all frame synchronization confirmation information is received after the preset time, the first device directly plays the next frame.

In this embodiment, a first device acquires frame synchronization information at intervals of a preset time, where the frame synchronization information is frame information of a frame that the first device starts to play currently; the first device sends the frame synchronization information to at least one second device; and the second device acquires, according to the frame information of the frame that starts to be played currently, a resource of the frame that starts to be played currently, and sends frame synchronization confirmation information to the first device. Because the first device determines time to play a next frame after receiving the frame synchronization confirmation information sent by all second devices, a delay of frame playback between second devices can be decreased by means of multiple frame synchronization operations; and therefore, it can be achieved that, after devices receive the frame information, a synchronization effect among the multiple smart devices is improved.

In the foregoing embodiment, steps S608 and S609 are optional steps, and the time to play the next frame by the first device is not affected by the second device. The second device may also not send the frame synchronization confirmation information to the first device, so as to reduce communication interaction between devices and reduce impact of a device with poor performance on another device.

In the foregoing embodiments, the first device and at least one second device, which participate in synchronous playback, may communicate with each other by using wireless fidelity (wifi), the Internet (internet), Ethernet (Ethernet), Bluetooth, wireless fidelity network direct (wifi direct), and the like.

Figure 7:
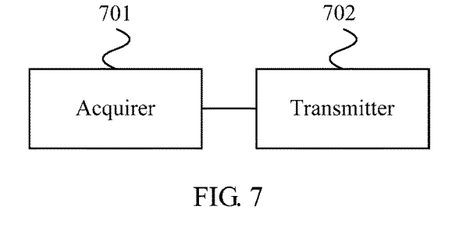
FIG. 7 is a schematic structural diagram of Embodiment 1 of an smart device according to the present invention.

FIG. 7 is a schematic structural diagram of Embodiment 1 of an smart device according to the present invention. The smart device is a first device. As shown in FIG. 7, the apparatus in this embodiment includes an acquirer 701 and a transmitter 702, where the acquirer 701 is configured to acquire frame synchronization information at intervals of a preset time; and the transmitter 702 is configured to send the frame synchronization information to at least one second device, so that the second device performs playback according to the frame synchronization information.

Figure 8:
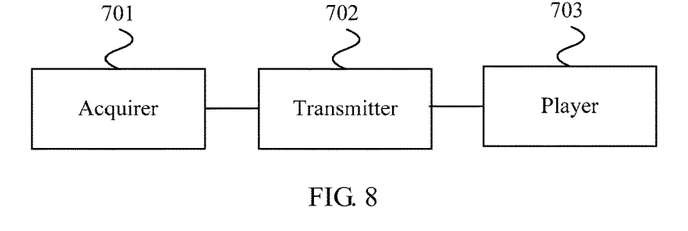
FIG. 8 is another schematic structural diagram of Embodiment 1 of an smart device according to the present invention.

FIG. 8 is another schematic structural diagram of Embodiment 1 of an smart device according to the present invention. FIG. 8 is based on the embodiment shown in FIG. 7, and a player 703 is further included, where the frame synchronization information includes frame information of a frame to be played by the first device, and the player 703 is configured to play, when the transmitter completes sending the frame synchronization information to the at least one second device, the frame to be played.

The apparatus in this embodiment may be accordingly used to implement the technical solution in the method embodiment shown in FIG. 1, and implementation principles and technical effects of the apparatus are similar and are not described herein again.

Figure 9:
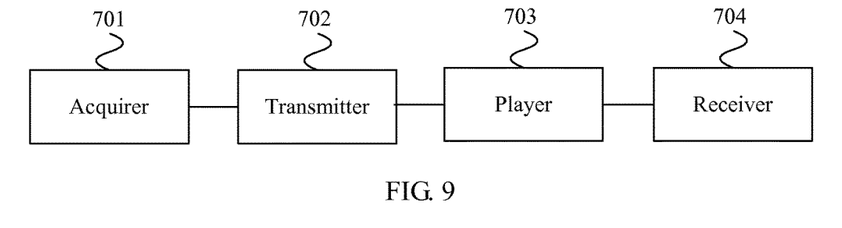
FIG. 9 is a schematic structural diagram of Embodiment 3 of an smart device according to the present invention.

FIG. 9 is a schematic structural diagram of Embodiment 3 of an smart device according to the present invention. The smart device is a first device. This embodiment is based on the embodiment shown in FIG. 8, and a receiver 704 is further included, where the receiver 704 is configured to receive frame synchronization confirmation information sent by the second device, and the frame synchronization confirmation information is used to instruct the player to play the frame to be played; and the player is specifically configured to play, when the receiver receives the frame synchronization confirmation information, the frame to be played.

In the foregoing embodiment, the transmitter 702 is further configured to send a playback preparation instruction to the at least one second device, where the playback preparation instruction includes address information of a media resource to be played, so that the second device acquires, according to the address information of the media resource to be played, the media resource to be played;

the receiver 704 is further configured to receive, when the transmitter completes sending the playback preparation instruction to the at least one second device, preparation completion information sent by the second device, where the preparation completion information is used to instruct the first device to acquire the frame synchronization information at intervals of the preset time; and the acquirer 701 is specifically configured to acquire the frame synchronization information at intervals of the preset time when the receiver receives the preparation completion information sent by the second device.

In the foregoing embodiment, the receiver 704 is further configured to receive synchronous playback request information sent by the second device; and the transmitter 702 is specifically configured to send the playback preparation instruction to the at least one second device when the receiver receives the synchronous playback request information.

The apparatus in this embodiment may be used to implement the technical solution corresponding to the first device in the method embodiment shown in FIG. 3, and implementation principles and technical effects of the apparatus are similar and are not described herein again.

The present invention further provides Embodiment 4 of an smart device, and a schematic structural diagram of the smart device in Embodiment 4 is the same as FIG. 7. In this embodiment, when the frame synchronization information includes frame information of a frame that the first device starts to play currently, the transmitter 702 is specifically configured to send, to the at least one second device, the frame information of the frame that the first device starts to play currently, so that the second device plays, according to the frame information of the frame that starts to be played currently, the frame that starts to be played currently.

The apparatus in this embodiment may be accordingly used to implement the technical solution in the method embodiment shown in FIG. 4, and implementation principles and technical effects of the apparatus are similar and are not described herein again.

The present invention further provides Embodiment 5 of an smart device, and a schematic structural diagram of the smart device in Embodiment 5 is the same as FIG. 8. In this embodiment, the player 703 is configured to: when the transmitter completes sending, to the at least one second device, the frame information of the frame that the first device starts to play currently, if frame synchronization confirmation information sent by the second device is received within a preset time, play a next frame after the player waits for playback of the frame that starts to be played currently to finish, where the preset time is a playback time of one frame; and if the frame synchronization confirmation information of the second device is received after the preset time, directly play, by the player, the next frame.

The present invention further provides Embodiment 6 of an smart device, and a schematic structural diagram of the smart device in Embodiment 6 is the same as FIG. 9. In this embodiment, the transmitter 702 is further configured to send the playback preparation instruction to the at least one second device, where the playback preparation instruction includes the address information of the media resource to be played, so that the second device acquires, according to the address information of the media resource to be played, the media resource to be played; the receiver 704 is further configured to receive, when the transmitter completes sending the playback preparation instruction to the at least one second device, the preparation completion information sent by the second device, where the preparation completion information is used to instruct the first device to acquire the frame synchronization information at intervals of the preset time; and the acquirer 701 is specifically configured to acquire the frame synchronization information at intervals of the preset time when the receiver receives the preparation completion information sent by the second device.

In the foregoing embodiment, the receiver 704 is further configured to receive synchronous playback request information sent by the second device; and the transmitter 702 is specifically configured to send the playback preparation instruction to the at least one second device when the receiver receives the synchronous playback request information.

The apparatus in this embodiment may be used to implement the technical solution corresponding to the first device in the embodiment shown in FIG. 6, and implementation principles and technical effects of the apparatus are similar and are not described herein again.

Figure 10:
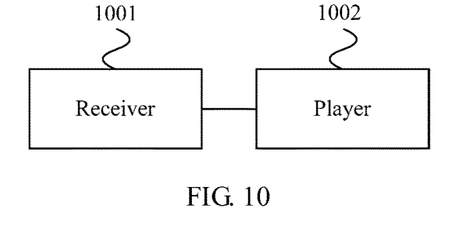
FIG. 10 is a schematic structural diagram of Embodiment 7 of an smart device according to the present invention.

FIG. 10 is a schematic structural diagram of Embodiment 7 of an smart device according to the present invention, and the smart device in this embodiment is a second device. The apparatus in this embodiment includes a receiver 1001 and a player 1002, where the receiver 1001 is configured to receive frame synchronization information sent by a first device at intervals of a preset time; and the player 1002 is configured to perform playback according to the frame synchronization information when the receiver receives the frame synchronization information.

Based on the embodiment shown in FIG. 10, when the frame synchronization information includes frame information of a frame to be played by the first device, the player 1002 is specifically configured to play, according to the frame information of the frame to be played, the frame to be played.

The apparatus in this embodiment may be used to implement the technical solution in the method embodiment shown in FIG. 2, and implementation principles and technical effects of the apparatus are similar and are not described herein again.

Figure 11:
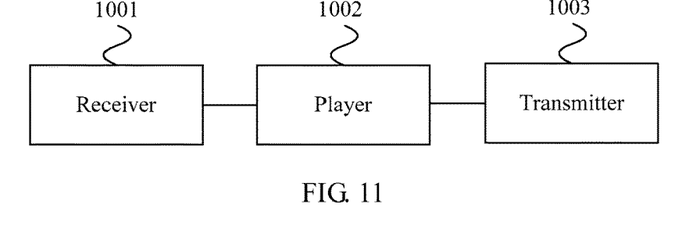
FIG. 11 is a schematic structural diagram of Embodiment 8 of an smart device according to the present invention.

FIG. 11 is a schematic structural diagram of Embodiment 8 of an smart device according to the present invention. The smart device is a second device. This embodiment is based on the embodiment shown in FIG. 10, and a transmitter 1003 is further included, where the transmitter 1003 is configured to send frame synchronization confirmation information to the first device, so that the first device plays, according to the frame synchronization confirmation information, the frame to be played. The player 1002 is configured to start to play, according to the frame information of the frame to be played, when the transmitter completes the frame synchronization confirmation information, the frame to be played.

In the foregoing embodiment, the receiver 1001 is configured to receive a playback preparation instruction sent by the first device, where the playback preparation instruction includes address information of a media resource to be played; the player 1002 is further configured to acquire, according to the address information of the media resource to be played, when the receiver receives the playback preparation instruction, the media resource to be played; the transmitter 1003 is further configured to send preparation completion information to the first device when the player acquires the media resource to be played; and the receiver 1001 is specifically configured to receive, when the transmitter completes sending the preparation completion information, the frame synchronization information sent by the first device at intervals of the preset time.

In the foregoing embodiment, the transmitter 1003 is further configured to send synchronous playback request information to the first device, so that the first device sends the playback preparation instruction to the second device according to the synchronous playback request information; and the receiver 1001 is further configured to receive, when the transmitter completes sending the synchronous playback request information, the playback preparation instruction sent by the first device.

The apparatus in this embodiment may be used to implement the technical solution corresponding to the second device in the method embodiment shown in FIG. 3, and implementation principles and technical effects of the apparatus are similar and are not described herein again.

The present invention further provides Embodiment 9 of an smart device, and a schematic structural diagram of Embodiment 9 is the same as FIG. 10. In this embodiment, the frame synchronization information is frame information of a frame that the first device starts to play currently, and the player 1002 is specifically configured to play, according to the frame information of the frame that starts to be played currently, the frame that starts to be played currently.

The apparatus in this embodiment may be used to implement the technical solution in the method embodiment shown in FIG. 5, and implementation principles and technical effects of the apparatus are similar and are not described herein again.

The present invention further provides Embodiment 10 of an smart device, and a schematic structural diagram of Embodiment 10 is the same as FIG. 11. In this embodiment, the transmitter 1003 is further included and is configured to send frame synchronization confirmation information to the first device, so that the first device determines, according to the frame synchronization confirmation information, time to play a next frame. The player 1002 is specifically configured to play, according to the frame information of the frame that starts to be played currently, when the transmitter completes sending the frame synchronization confirmation information, the frame that starts to be played currently.

In the foregoing embodiment, the receiver 1001 is further configured to receive a playback preparation instruction sent by the first device, where the playback preparation instruction includes address information of a media resource to be played; the player 1002 is further configured to acquire, according to the address information of the media resource to be played, when the receiver receives the playback preparation instruction, the media resource to be played; the transmitter 1003 is further configured to send preparation completion information to the first device when the player acquires the media resource to be played; and the receiver 1001 is specifically configured to receive, when the transmitter completes sending the preparation completion information, the frame synchronization information sent by the first device at intervals of the preset time.

In the foregoing embodiment, the transmitter 1003 is further configured to send synchronous playback request information to the first device, so that the first device sends the playback preparation instruction to the second device according to the synchronous playback request information; and the receiver 1001 is further configured to receive, when the transmitter completes sending the synchronous playback request information, the playback preparation instruction sent by the first device.

The apparatus in this embodiment may be used to implement the technical solution corresponding to the second device in the method embodiment shown in FIG. 6, and implementation principles and technical effects of the apparatus are similar and are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for synchronous playback by multiple devices, comprising:
   sending, by a first device, a playback preparation instruction to a second device, wherein the playback preparation instruction comprises address information of a media resource to be played, so that the second device acquires, according to the address information of the media resource to be played, the media resource to be played from a third device;
   receiving, by the first device, preparation completion information sent by the second device, wherein the preparation completion information is used to instruct the first device to acquire frame synchronization information at intervals of a preset time;
   acquiring, by the first device, the frame synchronization information at intervals of the preset time, wherein the frame synchronization information comprises frame information of a frame to be played;
   sending, by the first device, the frame synchronization information to the second device, so that the second device performs playback of the frame to be played according to the frame synchronization information, wherein the first device and the second device are located in one local area network, wherein the frame synchronization information is sent by the first device to the second device at intervals of the preset time; and after the sending, by the first device, the frame synchronization information to the second device, the method further comprises:

before playing, by the first device, the frame to be played, receiving, by the first device, frame synchronization confirmation information sent by the second device, wherein the frame synchronization confirmation information is used to instruct the first device to play the frame to be played, and playing, by the first device, the frame to be played, such that the second device and the first device simultaneously play the frame to be played.

2. The method according to claim 1, wherein after the sending, by the first device, the frame synchronization information to the second device, the method further comprises:

in response to the first device receiving, within a preset time, the frame synchronization confirmation information sent by the second device, playing, by the first device, a next frame after waiting until playback of the frame to be played is complete, wherein the preset time is a playback time of one frame; and in response to the first device receiving, after the preset time, the frame synchronization confirmation information of the second device, directly playing, by the first device, the next frame.

3. The method according to claim 1, wherein the frame synchronization information is sent by the first device to the second device at intervals of N frames, wherein N is an integer less than 10.

4. The method according to claim 1, wherein the playback preparation instruction further comprises one or more of:
   a start time point of playback;
   video display indication information for indicating how a video of the media resource is displayed on the second device;
   audio playback indication information for indicating how an audio of the media resource is played; and/or
   subtitles display indication information for indicating how subtitles of the media resource are displayed.

5. The method according to claim 4 wherein the video display indication information includes one or more of: a setting indicating displaying part of an original video, displaying in a picture-in-picture mode, a full-screen display, a proportional display, a full width display, a full height display, displaying on a left side, displaying on a right side, displaying near a top, and/or displaying near a bottom.

6. A method for synchronous playback by multiple devices, comprising:

receiving, by a second device, a playback preparation instruction sent by a first device, wherein the playback preparation instruction comprises address information of a media resource to be played;

acquiring, by the second device according to the address information of the media resource to be played, the media resource to be played from a third device;

sending, by the second device, preparation completion information to the first device, wherein the preparation completion information is used to instruct the first device to acquire frame synchronization information at intervals of a preset time;

receiving, by the second device, the frame synchronization information sent by the first device at intervals of a preset time, wherein the frame synchronization information comprises frame information of a frame to be played, and wherein the first device and the second device are located in one local area network;

before playing, by the first device, the frame to be played, sending, by the second device, frame synchronization confirmation information to the first device, so that the first device plays, according to the frame synchronization confirmation information, the frame to be played; and performing, by the second device, playback according to the frame synchronization information, the playback comprising playing, by the second device according to the frame information of the frame to be played, the frame to be played, such that the second device and the first device simultaneously play the frame to be played.

7. A device, wherein the device is a first device and comprises:
   a receiver; and
   a transmitter,
   wherein the transmitter is configured to send a playback preparation instruction to a second device, wherein the playback preparation instruction comprises address information of a media resource to be played, so that the second device acquires, according to the address information of the media resource to be played, the media resource to be played from a third device;
   wherein the receiver is configured to receive preparation completion information sent by the second device, wherein the preparation completion information is used to instruct the first device to acquire frame synchronization information at intervals of a preset time;
   wherein the receiver is configured to acquire frame synchronization information at intervals of a preset time, wherein the frame synchronization information comprises frame information of a frame to be played; and
   wherein the transmitter is configured to send the frame synchronization information to the second device, so that the second device performs playback of the frame to be played according to the frame synchronization information, wherein the first device and the second device are located in one local area network, wherein the frame synchronization information is sent by the transmitter to the second device at intervals of the preset time;
   wherein after the transmitter sends the frame synchronization information to the second device and before playing, by the first device, the frame to be played, the receiver receives frame synchronization confirmation information sent by the second device, wherein the frame synchronization confirmation information is used to instruct the first device to play the frame to be played, such that the second device and the first device simultaneously play the frame to be played.

8. The device according to claim 7, wherein:
after the transmitter completes sending, to the second device, the frame synchronization information to the second device, if the frame synchronization confirmation information sent by the second device is received within a preset time, the first device plays a next frame after the first device waits for playback of the frame to be played to finish, wherein the preset time is a playback time of one frame; and if the frame synchronization confirmation information of the second device is received after the preset time, directly play the next frame.

9. A device, wherein the device is a second device and comprises:

a receiver; and a transmitter;

wherein the receiver is configured to receive a playback preparation instruction sent by a first device, wherein the playback preparation instruction comprises address information of a media resource to be played, so that the second device acquires, according to the address information of the media resource to be played, the media resource to be played from a third device;

wherein the transmitter is configured to send preparation completion information to the first device when the second device acquires the media resource to be played;

wherein the receiver is configured to receive, when the transmitter completes sending the preparation completion information, frame synchronization information sent by a first device at intervals of a preset time, wherein the frame synchronization information comprises frame information of a frame to be played, and wherein the first device and the second device are located in one local area network; and wherein the transmitter is configured to send, before playing, by the first device, the frame to be played, frame synchronization confirmation information to the first device, so that the first device plays, according to the frame synchronization confirmation information, the frame to be played, wherein the second device is configured to perform playback of the frame to be played according to the frame synchronization information, such that the second device and the first device simultaneously play the frame to be played.

* * * * *